(12) United States Patent
Vrancic et al.

(10) Patent No.: US 8,204,925 B2
(45) Date of Patent: Jun. 19, 2012

(54) CONTROLLING OR ANALYZING A PROCESS BY SOLVING A SYSTEM OF LINEAR EQUATIONS IN REAL-TIME

(75) Inventors: Aljosa Vrancic, Austin, TX (US); Lothar Wenzel, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 602 days.

(21) Appl. No.: 12/468,160

(22) Filed: May 19, 2009

(65) Prior Publication Data

US 2009/0292511 A1 Nov. 26, 2009

Related U.S. Application Data

(60) Provisional application No. 61/055,434, filed on May 22, 2008.

(51) Int. Cl.
G06F 17/12 (2006.01)
G06F 7/38 (2006.01)
G06F 7/32 (2006.01)
G06F 7/52 (2006.01)
G06G 7/32 (2006.01)
G06G 7/34 (2006.01)
G06G 7/36 (2006.01)

(52) U.S. Cl. ............ 708/446; 703/2; 708/520; 708/607; 708/802; 708/803; 708/804

(58) Field of Classification Search ...... 703/2; 708/446, 708/520, 607, 802–804
See application file for complete search history.

(56) References Cited

U.S. PATENT DOCUMENTS 2,455,974 A * 12/1948 Brown .......................... 708/803
(Continued)

FOREIGN PATENT DOCUMENTS

JP 05303587 A * 11/1993

OTHER PUBLICATIONS

Cichocki, A.; Unbehauen, R.;, "Neural networks for solving systems of linear equations and related problems," Circuits and Systems I: Fundamental Theory and Applications, IEEE Transactions on , vol. 39, No. 2, pp. 124-138, Feb. 1992 doi: 10.1109/81.167018.*

(Continued)

*Primary Examiner* — Kamini S Shah
*Assistant Examiner* — Akash Saxena
(74) *Attorney, Agent, or Firm* — Meyertons Hood Kivlin Kowert & Goetzel, P.C.; Jeffrey C. Hood; Mark S. Williams

(57) ABSTRACT

System and method for controlling/analyzing a process by solving a system of linear equations in real-time. Linear equations that model the process are stored. In an off-line stage a partitioning strategy is determined based on the linear equations, including determining groups of values for recursively partitioning a set of values measured and/or computed from the process. In an on-line stage: current process data are received from the process, including measurements from the process, and composing a set of values; the linear equations are recursively solved for a first group of the set, where the first group partitions the set into respective subsets of values, and where the recursively solving produces solved values for respective first groups of the set/subset of values; the linear equations are solved for remaining unsolved values in the set, thereby producing solved values for the set, which are stored and are useable to control/analyze the process.

23 Claims, 10 Drawing Sheets

U.S. PATENT DOCUMENTS

| | | | | |
|---|---|---|---|---|
| 4,353,119 A * | 10/1982 | Daniel et al. | | 708/446 |
| 4,611,312 A * | 9/1986 | Ikeda | | 702/14 |
| 4,831,549 A * | 5/1989 | Red et al. | | 700/254 |
| 5,200,915 A * | 4/1993 | Hayami et al. | | 708/520 |
| 5,301,342 A * | 4/1994 | Scott | | 708/446 |
| 5,392,429 A * | 2/1995 | Agrawal et al. | | 708/446 |
| 5,490,278 A * | 2/1996 | Mochizuki | | 708/446 |
| 5,548,798 A * | 8/1996 | King | | 708/446 |
| 5,655,137 A * | 8/1997 | Kevorkian | | 708/446 |
| 5,887,186 A * | 3/1999 | Nakanishi | | 712/28 |
| 6,064,808 A * | 5/2000 | Kapur et al. | | 703/2 |
| 6,078,938 A * | 6/2000 | Pan et al. | | 708/500 |
| 6,085,133 A * | 7/2000 | Keuper et al. | | 703/8 |
| 6,513,001 B1 * | 1/2003 | Kapur et al. | | 703/2 |
| 6,574,650 B1 * | 6/2003 | Aoki | | 708/446 |
| 6,577,992 B1 * | 6/2003 | Tcherniaev et al. | | 703/14 |
| 6,636,828 B1 * | 10/2003 | Hachiya | | 703/2 |
| 6,694,343 B2 * | 2/2004 | Forrest et al. | | 708/520 |
| 6,807,536 B2 * | 10/2004 | Achlioptas et al. | | 702/181 |
| 6,810,370 B1 * | 10/2004 | Watts, III | | 703/2 |
| 7,065,545 B2 * | 6/2006 | Quintero-de-la-Garza | | 708/446 |
| 7,089,275 B2 * | 8/2006 | Garg | | 708/446 |
| 7,236,998 B2 * | 6/2007 | Nutter et al. | | 708/446 |
| 7,433,743 B2 | 10/2008 | Pistikopoulos et al. | | |
| 7,484,195 B1 * | 1/2009 | Korobkov | | 703/2 |
| 7,672,818 B2 * | 3/2010 | Watts, III | | 703/5 |
| 7,720,651 B2 * | 5/2010 | Canning | | 703/2 |
| 2002/0138537 A1 * | 9/2002 | Forrest et al. | | 708/620 |
| 2003/0172099 A1 * | 9/2003 | Walster et al. | | 708/446 |
| 2004/0010400 A1 * | 1/2004 | Canning | | 703/2 |
| 2004/0078174 A1 * | 4/2004 | Canning | | 703/2 |
| 2004/0148324 A1 * | 7/2004 | Garg | | 708/446 |
| 2005/0071404 A1 * | 3/2005 | Nutter et al. | | 708/446 |
| 2005/0102343 A1 * | 5/2005 | Tsang et al. | | 708/446 |
| 2005/0160128 A1 * | 7/2005 | Fardanesh | | 708/446 |
| 2005/0222825 A1 * | 10/2005 | Feldmann et al. | | 703/2 |
| 2006/0085173 A1 * | 4/2006 | Takei et al. | | 703/2 |
| 2006/0104510 A1 * | 5/2006 | Aharon et al. | | 382/173 |
| 2006/0265204 A1 * | 11/2006 | Wallis et al. | | 703/10 |
| 2008/0120357 A1 | 5/2008 | Theis | | |
| 2009/0138245 A1 * | 5/2009 | Appleyard | | 703/2 |
| 2009/0268085 A1 * | 10/2009 | Myaskouvskey et al. | | 348/441 |
| 2009/0292511 A1 * | 11/2009 | Vrancic et al. | | 703/2 |
| 2010/0082142 A1 * | 4/2010 | Usadi et al. | | 703/2 |
| 2010/0082724 A1 * | 4/2010 | Diyankov et al. | | 708/520 |

OTHER PUBLICATIONS

Berkovich, S.Y.;, "An overlaying technique for solving linear equations in real-time computing," Computers, IEEE Transactions on, vol. 42, No. 5, pp. 513-517, May 1993 doi: 10.1109/12.223670.*

Stabrowski, M.;, "Block split and merge algorithm for the solution of dense linear equation systems," Magnetics, IEEE Transactions on, vol. 19, No. 6, pp. 2547-2550, Nov. 1983 doi: 10.1109/TMAG.1983.1062892.*

* cited by examiner store a sparse and weakly coupled coefficient matrix M that specifies a system of N1 linear equations with N2 unknowns, M*x = b, where b includes a vector of known values, and where x includes a vector of unknown values, where the system of N1 linear equations models the process
602 perform an offline stage
604 analyze the matrix M to determine an underlying structure of the matrix corresponding to a geometry of the process, including permuting two or more rows and/or columns of the matrix M
612 determine a partitioning strategy based on the underlying structure of the matrix M, where determining the partitioning strategy
614 determine a first subvector xs of vector x that partitions vector x into a first plurality of subvectors xp
622 determine respective second subvectors xs for each of the first plurality of subvectors xp, where each second subvector xs partitions a respective subvector xp of the first plurality of subvectors xp into respective second pluralities of subvectors xp
624 recursively determine successive pluralities of subvectors xs and respective subvectors xp until a stopping condition obtains
626 pre-calculate coefficients for evaluating exact values of subvectors xs
616

CONTROLLING OR ANALYZING A PROCESS BY SOLVING A SYSTEM OF LINEAR EQUATIONS IN REAL-TIME

PRIORITY INFORMATION

This application claims benefit of priority to U.S. Provisional Application Ser. No. 61/055,434 titled "Controlling or Analyzing a Process by Solving A System of Linear Equations in Real-Time" filed on May 22, 2008, whose inventor was Aljosa Vrancic, and which is hereby incorporated by reference.

FIELD OF THE INVENTION

The present invention relates to the field of process control and analysis, and more particularly to controlling or analyzing a process by solving a system of linear equations in real-time.

DESCRIPTION OF THE RELATED ART

Most basic computational algorithms for high-performance computing (HPC) are designed to achieve the best average performance in off-line calculations, where the goal is for the calculation to end in as little time as possible, but where each step in general does not have a strict time deadline. As a result, such algorithms are not generally applicable in real-time embedded environments that have strict per/iteration timing constraints, e.g., where each iteration must complete within a millisecond or less. For example, many scientific and industrial applications involve modeling phenomena or processes using systems of linear equations, e.g., N equations with N unknowns, which, depending on the number of unknowns, may not be solvable in real-time using current techniques, and so generally must be solved offline. Such systems may be specified by a coefficient matrix M, and, for example, may be of the form:

$$M*x=b. \quad (1)$$

Similarly, many problems (e.g., models of phenomena) require solution of a partial differential equation (PDE), e.g., a non-linear PDE, which, using iterative numeric techniques, reduces to solving a system of linear equations, and so also must generally be performed offline. However, some applications particularly need or require solving large systems of linear equations in real-time.

One example of an application that requires solving a non-liner PDE in real-time is tokamak-based nuclear fusion with its challenge of plasma control in tokamak confinements. As is well-known in the art of tokamak nuclear fusion reactors, the magnetic flux of the plasma for a fixed cross-section (R-radial component, Z-vertical component) of a toroidal tokamak container is described by the non-linear Grad-Shafranov partial differential equation:

$$R\frac{\partial}{\partial R}\left(\frac{1}{R}\frac{\partial \psi}{\partial R}\right)+\left(\frac{\partial^2 \psi}{\partial Z^2}\right) = \begin{cases} -\mu_o R j_\vartheta(R, \psi) & \text{in plasma} \\ 0 & \text{in vaccum} \end{cases} \quad (2)$$

Smaller coils measure the field resulting from the interaction between actuators and plasma. The measurements are then used to reconstruct magnetic flux by fitting solutions of (2) against those measurements. The solutions are then used to drive the actuator coils in such a way that a specific plasma shape is maintained. The cycle time of the entire reconstruction and control must be on the order of 1 ms or faster.

This is a very demanding problem as the spatial resolution of the underlying PDE grid must be good enough to derive valid control activities. Several strategies have been developed that move the Grad-Shafranov solver out of the loop. For example, in the case of ASDEX, HPC is used off-line to pre-calculate thousands of Grad-Shafranov parameter combinations that allow quick approximations to (2) in the real-time loop. Here, principal component analysis is used to make the connection between the HPC runs done in advance and real-time measurements. Such an approximation is still computationally demanding and currently runs on a 39×69 grid in about 0.2 ms on an 8-core system. Currently, experimental tokamaks work for 5-10 seconds. Future generations, namely ITER, will be much more demanding as they will need to operate for on the order of 10 minutes with much larger grid-sizes, greater numbers of input/output channels, and much tighter real-time requirements. Thus, these prior art techniques are inadequate for applications that require faster performance.

Thus, improved systems and methods are desired for solving differential equations in real-time.

SUMMARY OF THE INVENTION

Various embodiments of a system and method for solving differential equations in real-time are described, e.g., for controlling and/or analyzing a process (e.g., system) by solving a system of linear equations in real-time, i.e., under real-time constraints. It should be noted that in some embodiments, the techniques described herein may be used in the context of a larger problem. For example, many processes and systems may be characterized or modeled by partial differential equations (PDEs), e.g., non-linear elliptic PDEs. Solving such PDEs often requires iterative techniques that reduce to solving a system of linear equations. Thus, the techniques disclosed herein are also applicable to these types of applications.

In preferred embodiments, a system of linear equations modeling a process is solved in two stages: an off-line stage that may take a long time to pre-compute, and a real-time stage that uses pre-computed values and current input data from the process, e.g., boundary conditions for PDEs, to arrive at solution in a much shorter and deterministic time frame. The first stage is based on assumption that some of the problem parameters will remain constant throughout the calculation, e.g., grid size and PDE parameters, and is thus performed off-line as it may take a long time to compute. This stage may include analyzing the process or a representation of the process to determine a characteristic geometry of the process, which may then be used determine a recursion or partitioning strategy, and calculating coefficients that describe the process in individual partitions.

Even though the overall time required for off-line and on-line calculation for a single set of data may be much longer than that for solving the exact same problem using existing highly optimized algorithms, the real-time calculation can be made much faster. The penalty is that the pre-calculated data is problem specific and may have to be recalculated if the problem parameters change. This does not constitute a serious restriction since the problem parameters do not change for most analysis and control applications. Moreover, if they do change, one can pre-calculate data sets for various problem parameters and simply switch data on the fly, or the pre-calculated data set can be further parameterized based on expected changes. In other cases, one may have enough of time to recalculate the off-line data while the process is still being controlled with the previous data set.

The following describes one embodiment of a computer-implemented method for controlling or analyzing a process by solving a system of linear equations in real-time.

First, a first plurality of linear equations that models the process may be stored, e.g., in a memory medium of a computer system. For example, in one embodiment, information specifying the linear equations may be stored, e.g., a coefficient matrix M may be stored that specifies a system of linear equations of the form $M*x=b$. In preferred embodiments, the coefficient matrix M may be large, rectangular, sparse, and weakly coupled, where the system of linear equations is to be solved many times for different values of b. As used herein, the term 'weakly coupled' means that one can rearrange the rows and columns of M in such a way that the generated matrix M' is clearly block oriented where the majority of the blocks are extremely sparse or even completely sparse (all elements are equal to 0).

An off-line stage may be performed, i.e., the method elements of the off-line stage may be performed prior to controlling the process, e.g., days, weeks, etc., before controlling the process, e.g., by one or more computers that may or may not be coupled to the process. The off-line stage may include determining a partitioning strategy based on the first plurality of linear equations, where determining the partitioning strategy may include determining groups of values for recursively partitioning a determined set of values measured and/or computed from the process.

Then, an on-line stage may be performed, where the one or more computers performing the on-line stage method elements are coupled to the process being analyzed or controlled. The on-line stage may include the following:

Current process data may be received from the process, which may include performing measurements on the process, and may include a set of values. In some embodiments, the current process data may also include computed values, e.g., values interpolated or otherwise computed based on the measured values.

The first plurality of linear equations may be recursively solved for a first group of the set of values, where the first group of the set of values partitions the set of values into respective subsets of values, and where the recursively solving produces solved values for respective first groups of the set/subset of values. In other words, the first plurality of linear equations is solved for the first group of the set of values, and is used to partition the remainder of the set of values into subsets. Then, the first plurality of linear equations is solved for respective groups (further subsets) of each of these subsets, generating respective solved values, where each subset is then partitioned using the respective solved values, thereby generating further subsets, and so forth, in a recursive manner, until some stopping condition is met.

The first plurality of linear equations is then solved for remaining unsolved values in the set of values, where the recursively solving and the solving produce solved values for the set of values. Said another way, once the stopping condition is met, all those subsets of the set of values for which the equations have not been solved are processes, i.e., the equations are solved for these values.

Finally, the solved values for the set of values are stored, where the solved values are useable to control or analyze the process. For example, the on-line stage may be performed in an iterative manner to control the process.

BRIEF DESCRIPTION OF THE DRAWINGS

A better understanding of the present invention can be obtained when the following detailed description of the preferred embodiment is considered in conjunction with the following drawings, in which:

FIGS. 6A and 6B are flowchart diagrams illustrating a more detailed embodiment of a method for controlling or analyzing a process by solving a system of linear equations in real-time.

Figure 1A:
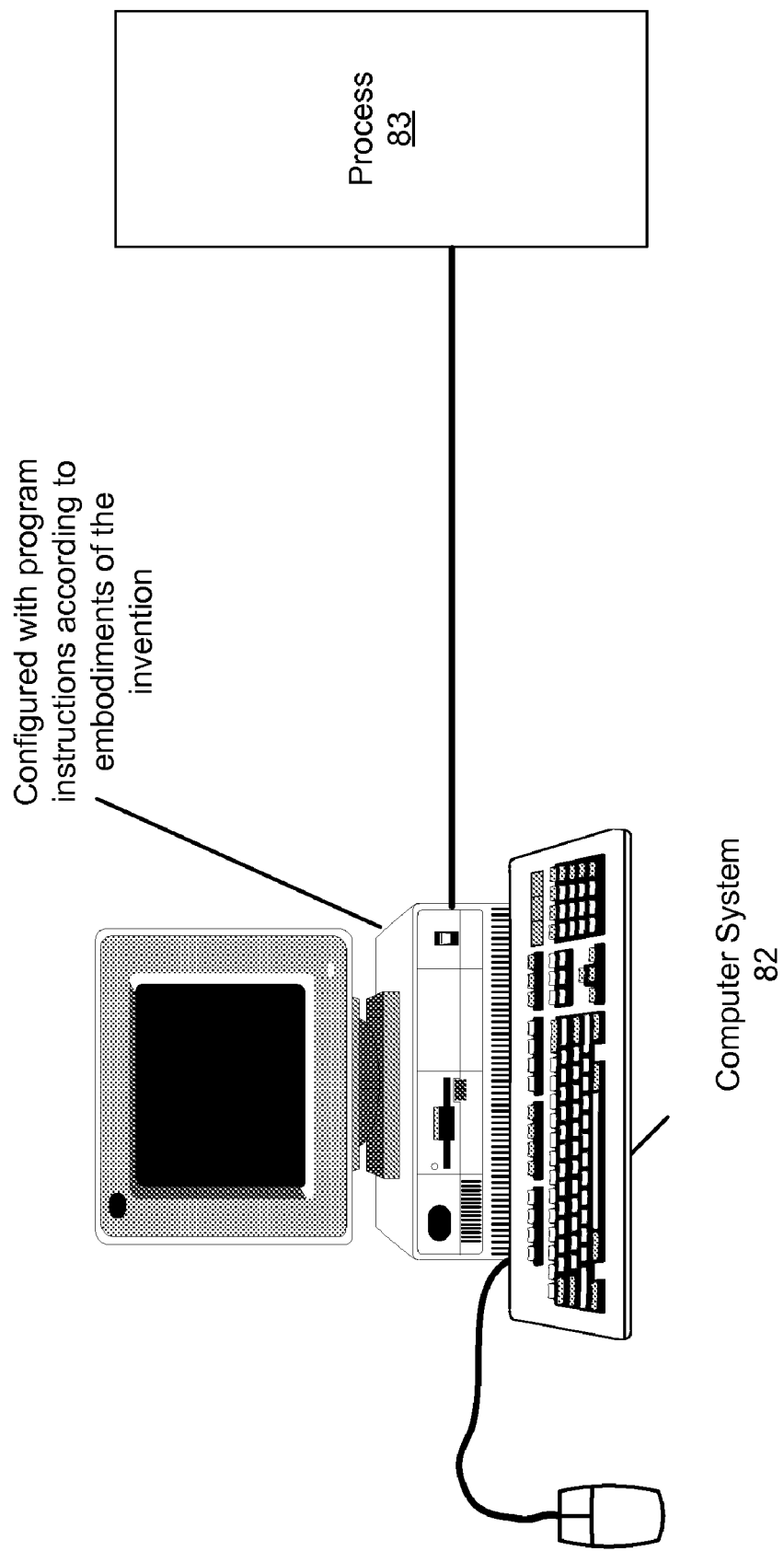
FIG. 1A illustrates a computer system that may implement embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Provisional Application Ser. No. 61/055,434 titled "Controlling or Analyzing a Process by Solving A System of Linear Equations in Real-Time" filed on May 22, 2008.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. Patent Application Publication No. 20050050515 (Ser. No. 10/892,829) titled "A Graphical Program Which Executes a Timed Loop", filed Jul. 16, 2004.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium that conveys signals such as electrical, electromagnetic, or digital signals, such as a bus, network and/or other physical transmission medium.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium and/or a programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Graphical Program—a plurality of interconnected nodes that visually represent the functionality of the program, where the program is executable or interpretable to perform the functionality.

Hardware Configuration Program—a program, e.g., a netlist or bit file, that can be used to program or configure a programmable hardware element.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Graphical User Interface Element—an element of a graphical user interface, such as for providing input or displaying output. Exemplary graphical user interface elements comprise input controls and output indicators Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data.

Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Solution Grid—a set of data or points for or at which a solution is to be determined. The grid may be a set of spatial coordinates, and/or may be a more abstract set of parameter values. For example, a grid may be a set of points at which a system of linear equations, or a partial differential equation, is to be solved. The grid data or data points may thus comprise known values which may be used to solve the equation or equations. Note that a grid may be rectangular and/or with regularly spaced values, or may be of other shapes, forms, arrangements, and/or dimensionality. A grid may also be represented with a vector, e.g., of appropriate size and dimension.

FIG. 1A—Computer System

FIG. 1A illustrates a computer system 82 configured to execute program instructions implementing embodiments of the present invention. As shown in FIG. 1A, the computer system 82 may include a display device configured to display an interface, such as a graphical user interface (GUI), facilitating interactions between a user and software executing on the computer system 82. For example, the graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs, e.g., text-based programs or graphical programs, which are executable to perform the methods described herein. In other words, some embodiments of the present invention may be implemented in software. Also, the memory medium may store a programming development environment application used to create and/or execute such programs. The memory medium may also store operating system software, as well as other software for operation of the computer system. Various embodiments further include receiving or storing instructions and/or data implemented in accordance with the foregoing description upon a carrier medium.

As may be seen, in this embodiment, the computer 82 is coupled to a process 83, e.g., for analysis and/or control, according to various embodiments of the invention described herein. Note that the process 83 may be any process as desired. Examples of processes contemplated include manufacturing processes, scientific processes, financial or securities-related processes, automation processes, simulation processes, petrochemical exploration and/or production processes, and so forth, as well as natural processes, e.g., weather, geophysical systems, etc., as desired, among others.

Note also that as used herein, the terms "process" and "system" may be used interchangeably. Thus, controlling or analyzing a process may be interpreted as controlling or analyzing a system that operates to perform the process, and vice versa.

Figure 1B:
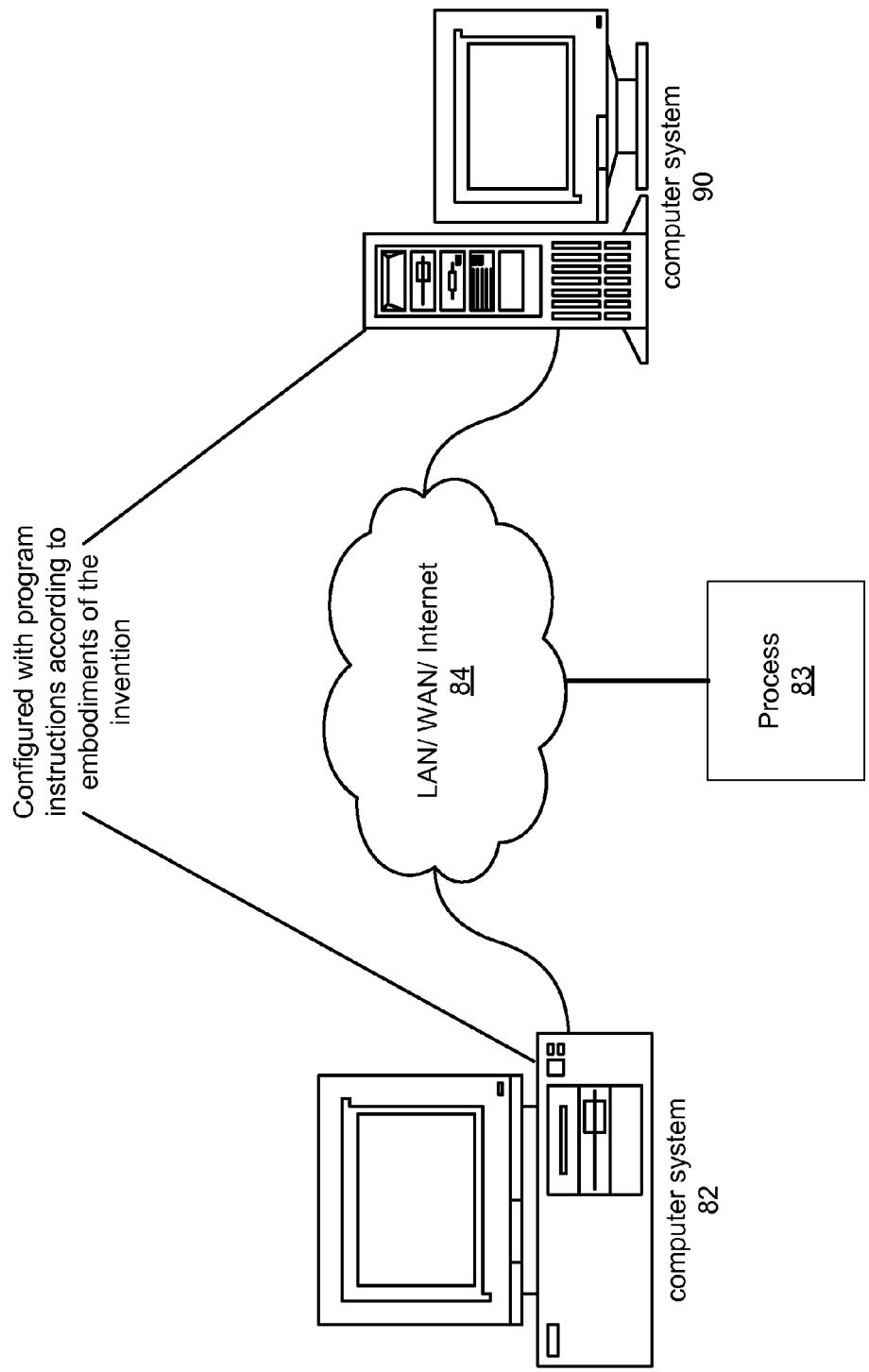
FIG. 1B illustrates a network system comprising two or more computer systems that may implement embodiments of the present invention.

FIG. 1B—Computer Network

FIG. 1B illustrates a networked computer system configured to implement embodiments of the present invention, including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, computer 82 may execute a first portion of the program and computer system 90 may execute a second portion of the program. As another example, computer 82 may display the user interface of a program and computer system 90 may execute the functional or application portion of the program.

In some embodiments, the program development environment may be the LabVIEW graphical program development environment provided by National Instruments Corporation, and the programs described herein may be graphical programs developed in the "G" graphical programming language also provided by National Instruments Corporation. For example, as described above in the glossary of terms, a graphical program comprises a plurality of interconnected nodes or icons, wherein the plurality of interconnected nodes or icons visually indicate functionality of the program. These interconnected nodes form a block diagram. In some cases, the graphical program may also include a user interface portion, referred to as a front panel, which includes one or more controls or indicators for human interaction with the program. Further details regarding graphical programming may be found in U.S. Pat. No. 4,914,568 titled "Graphical System for Modeling a Process and Associated Method", U.S. Pat. No. 5,481,741 titled "Method and Apparatus for Providing Attribute Nodes in a Graphical Data Flow Environment", U.S. Pat. No. 6,173,438 titled "Embedded Graphical Programming System", U.S. Pat. No. 6,219,628 titled "System and Method for Configuring an Instrument to Perform Measurement Functions Utilizing Conversion of Graphical Programs into Hardware Implementations", and U.S. Patent Application Publication No. 20010020291 (Ser. No. 09/745,023) titled "System and Method for Programmatically Generating a Graphical Program in Response to Program Information", each of which was incorporated by reference above.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

As FIG. 1B also shows, as with the system of FIG. 1A, process 83 is coupled to the computer system(s), in this case, via network 84, e.g., the Internet, for analysis and/or control, according to various embodiments of the invention described herein.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, characterization or analysis of a product, process, or phenomenon, etc. Exemplary test applications where the program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is configured to be used in any of various types of applications, including the analysis and/or control of other types of devices such as multimedia devices, video devices, audio devices, telephony devices, Internet devices, etc., as well as general purpose software applications such as word processing, spreadsheets, network control, network monitoring and/or management, financial applications, games, etc.

Figure 2A:
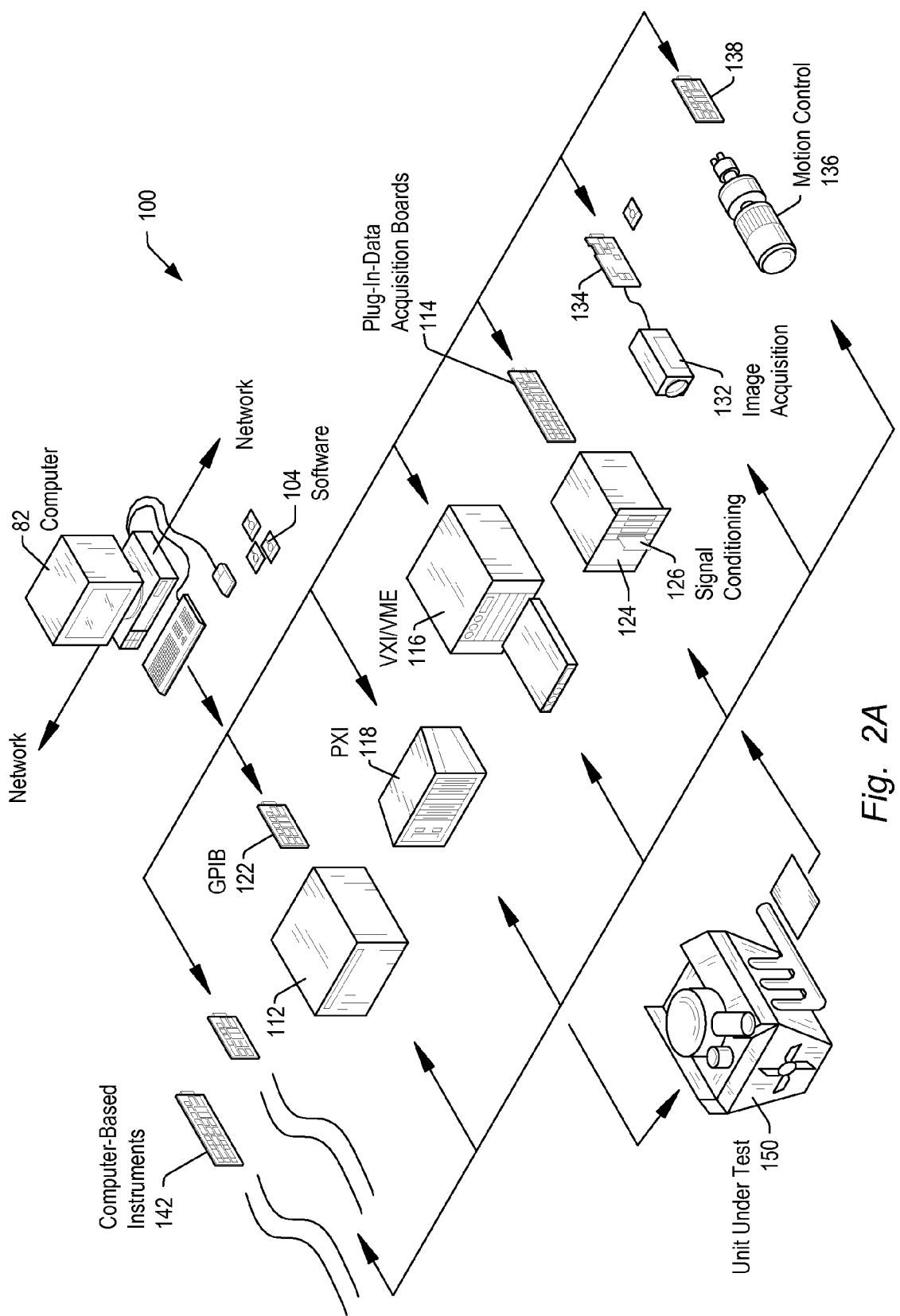
FIG. 2A illustrates an instrumentation control system according to one embodiment of the invention.

More generally, potential application fields include but are not limited to solving (non)linear partial differential equations (PDEs) using a difference method or FEM (finite element method), structural and modal analysis, PCA/ICA-centric (principal component analysis/independent component analysis) applications such as genetic DSP (digital signal processing) or audio reconstruction in noisy environments, and eigenvalue/eigenvector calculations in conjunction with Internet ranking, among others FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
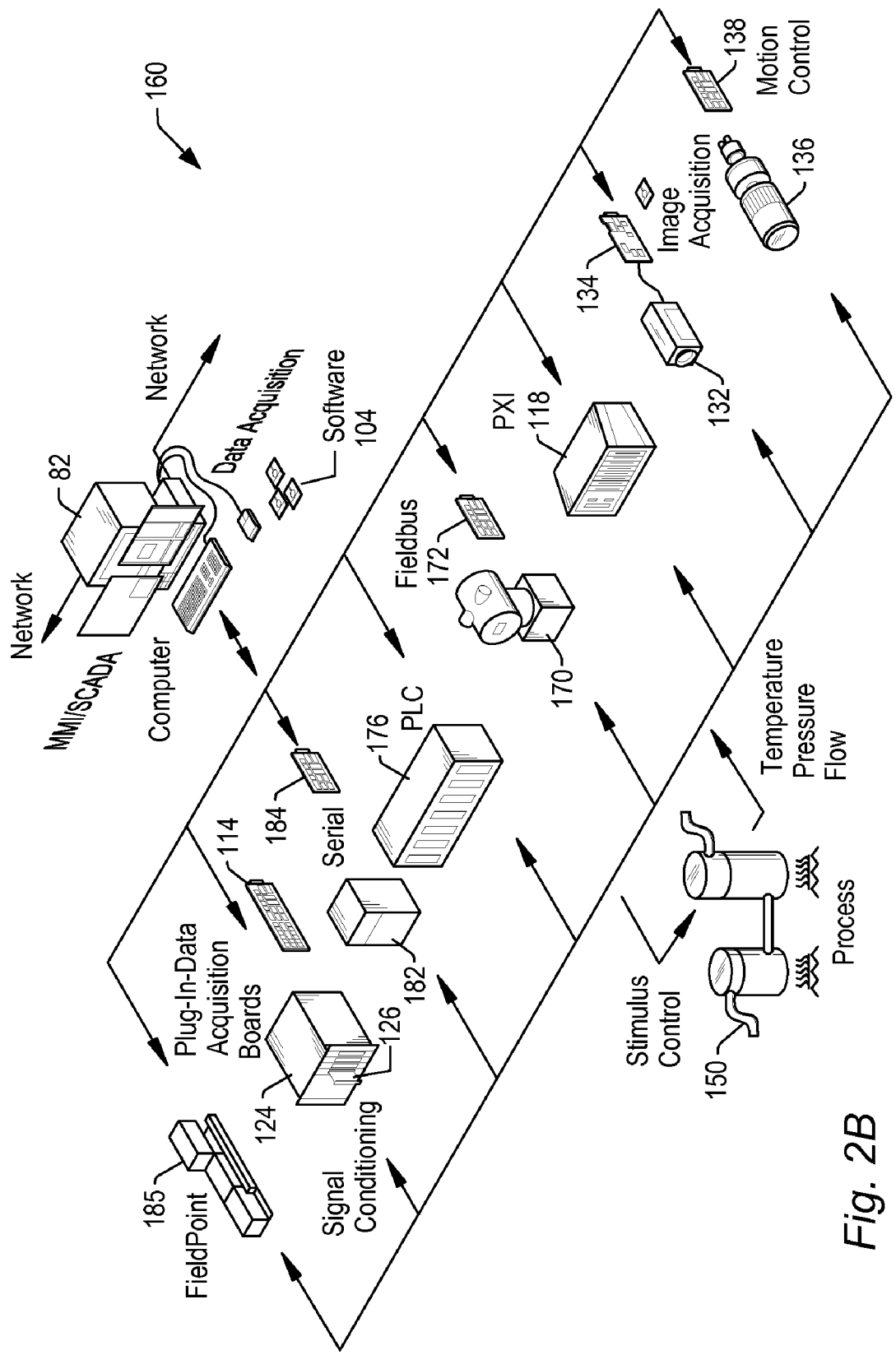
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
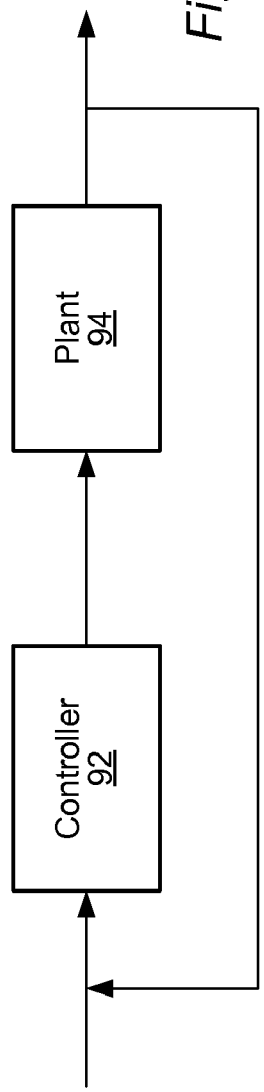
FIG. 3A is a high level block diagram of an exemplary system which may execute or utilize graphical programs.

FIG. 3A is a high-level block diagram of an exemplary system which may execute or utilize programs according to various embodiments of the invention. FIG. 3A illustrates a general high-level block diagram of a generic control and/or simulation system which comprises a controller 92 and a plant (or process) 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program that specifies or implements the functionality of one or both of the controller 92 and the plant 94. For example, a control engineer may use a modeling and simulation tool to create a model (program) of the plant 94 and/or to create the algorithm (program) for the controller 92. Of course, the above application is meant to be exemplary only, and others are contemplated, such as, for example, high-performance control applications, such as magnetic field control for plasma confinement in a tokamak fusion reactor, among others.

Figure 3B:
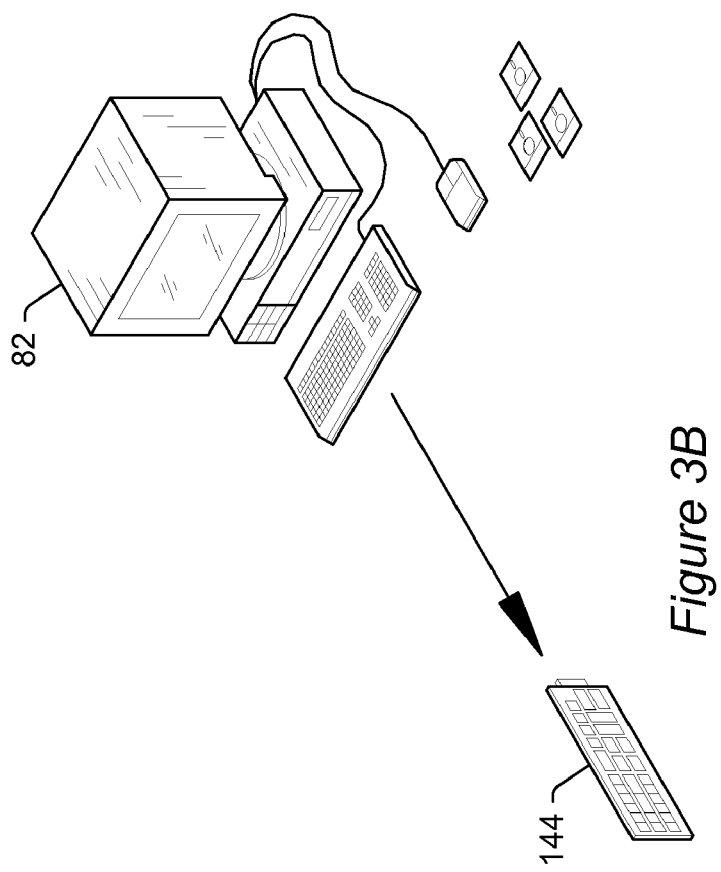
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program. In a similar manner, the plant 94 may be implemented by a computer system or other device 144 (e.g., including a processor and memory medium and/or including a programmable hardware element) that executes or implements a program, or may be implemented in or as a real physical system, e.g., a car engine, fusion reactor, etc.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program (e.g., a graphical program), and the program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a program. Thus the user may create a program on a computer and use (execute) the program on that computer or deploy the program, or a portion of the program, to a target device (for remote execution on the target device) that is remotely located from the computer and coupled to the computer through a network.

Note that graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
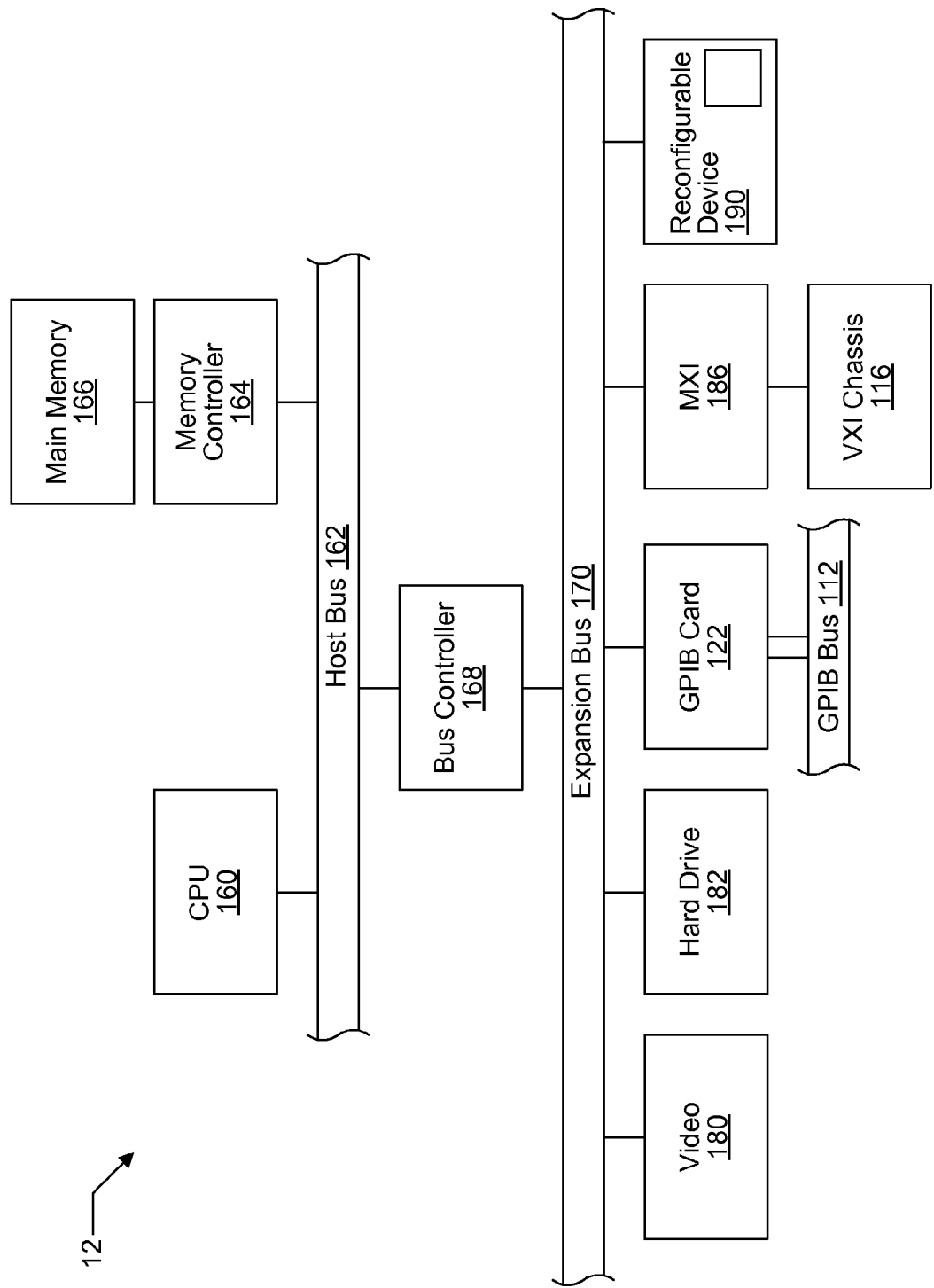
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIG. 1, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the program configured to be distributed across multiple execution targets, as well as a development environment for creating the program, and for specifying its distribution over multiple execution targets. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be configured to deploy a program, or a portion of a program, to the device 190 for execution of the program on the device 190. In some embodiments, the deployed program may take the form of graphical program instructions or data structures that directly represents the graphical program. Alternatively, the deployed program may take the form of text code (e.g., C code), which in some embodiments may be generated from a graphical program. As another example, the deployed graphical program may take the form of compiled code generated from either the graphical program or from text code that in turn may have been generated from the graphical program.

Overview

The following describes a novel approach for controlling and/or analyzing a process (e.g., system) by solving a system of linear equations in real-time, i.e., under real-time constraints. It should be noted that in some embodiments, the techniques described herein may be used in the context of a larger problem. For example, many processes and systems may be characterized or modeled by partial differential equations (PDEs), e.g., non-linear elliptic PDEs. Solving such PDEs often requires iterative techniques that reduce to solving a system of linear equations, as noted above. Thus, the techniques disclosed herein are also applicable to these types of applications.

In preferred embodiments, a system of linear equations modeling a process is solved in two stages: an off-line stage that may take a long time to pre-compute, and a real-time stage that uses pre-computed values and current input data from the process, e.g., boundary conditions for PDEs, to arrive at solution in a much shorter and deterministic time frame. The first stage is based on assumption that some of the problem parameters will remain constant throughout the calculation, e.g., grid size and PDE parameters, and is thus performed off-line as it may take a long time to compute. This stage may include analyzing the process or a representation of the process to determine a characteristic geometry of the process, which may then be used determine a recursion or partitioning strategy, and calculating coefficients that describe the process in individual partitions.

The second stage, i.e., the real-time stage, uses the pre-computed values and current (fresh) input data, for example boundary conditions for PDEs, to arrive at a solution in a shorter, deterministic time frame. Even though the overall time required for off-line and on-line calculation for a single value of b may be much larger than that for solving the exact same problem using existing highly optimized algorithms, the real-time calculation ends up being much faster. As mentioned earlier, the pre-calculated data is process specific and thus may have to be recalculated if the process parameters change. This does not constitute a serious restriction since the parameters do not change for most control applications. Even if they do, individual data sets can be pre-computed for an expected set of problem parameters. Switching between these data sets can be done at run time. Further parameterization of pre-calculated data sets can be done based on expected changes facilitating a larger variance in parameters. If time permits, a new data set can be computed while the process is still being controlled with the previous data set.

Such a method for analyzing or controlling a process is now described.

Figure 5:
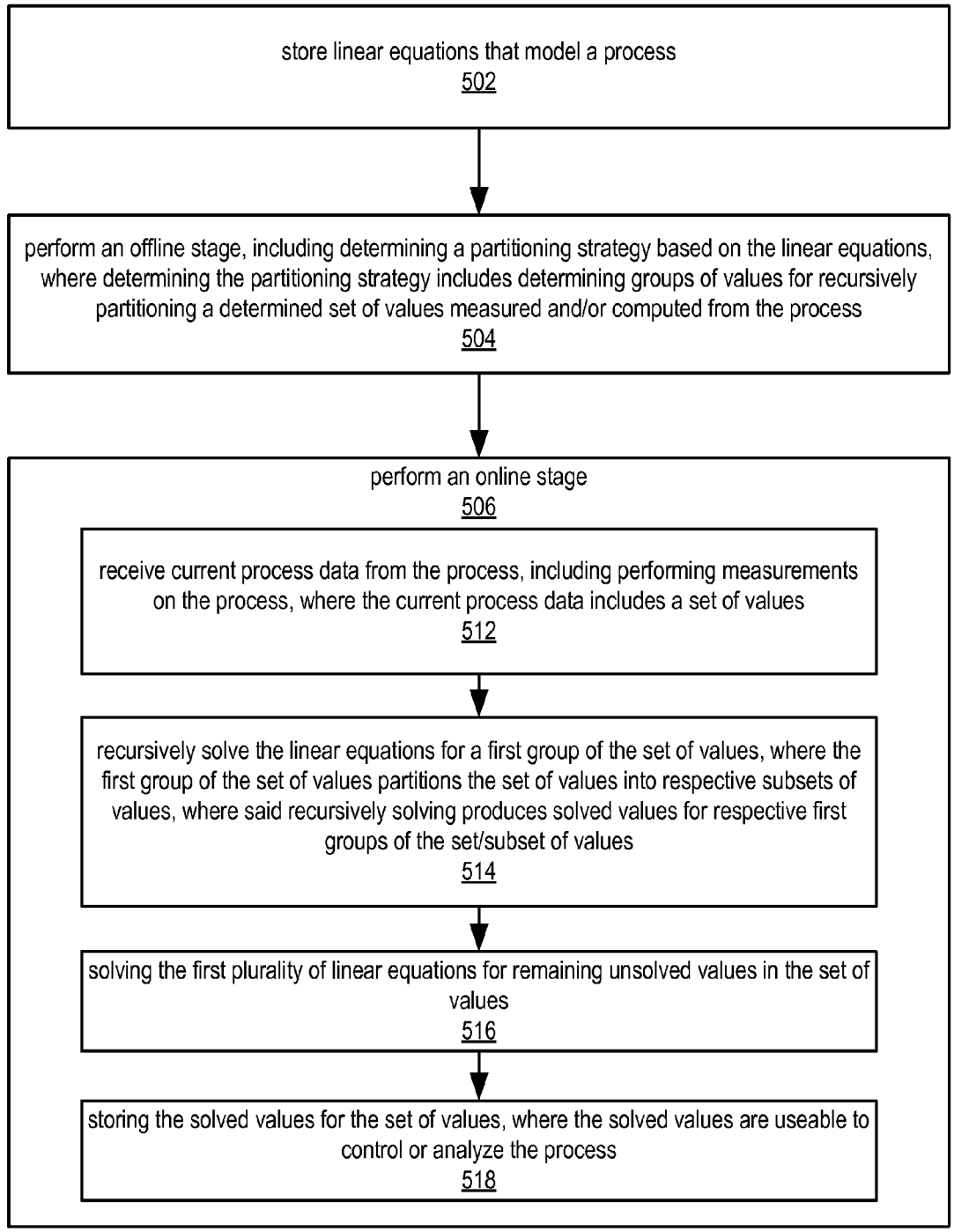
FIG. 5 is a flowchart diagram illustrating one embodiment of a method for creating a graphical program on a display having portions that execute on different targets; controlling or analyzing a process by solving a system of linear equations in real-time.

FIG. 5—Flowchart of a Method for Controlling or Analyzing a Process by Solving A System of Linear Equations in Real-Time FIG. 5 illustrates one embodiment of a computer-implemented method for controlling or analyzing a process by solving a system of linear equations in real-time. The method shown in FIG. 5 may be used in conjunction with any of the computer systems or devices shown in the above figures, among other devices. In various embodiments, some of the method elements shown may be performed concurrently, in a different order than shown, or may be omitted. Additional method elements may also be performed as desired. As shown, this method may operate as follows.

First, in 502, a first plurality of linear equations that models the process may be stored, e.g., in a memory medium of a computer system. For example, in one embodiment, information specifying the linear equations may be stored, e.g., a coefficient matrix M may be stored that specifies a system of linear equations of the form $M*x=b$. In preferred embodiments, the coefficient matrix M may be large, rectangular, sparse, and weakly coupled, where the system of linear equations is to be solved many times for different values of b. As used herein, the term 'weakly coupled' means that one can rearrange the rows and columns of M in such a way that the generated matrix M' is clearly block oriented where the majority of the blocks are extremely sparse or even completely sparse (all elements are equal to 0).

In 504, an off-line stage may be performed, i.e., the method elements of the off-line stage may be performed prior to controlling the process, e.g., days, weeks, etc., before controlling the process, e.g., by one or more computers that may or may not be coupled to the process. The off-line stage may include determining a partitioning strategy based on the first plurality of linear equations, where determining the partitioning strategy may include determining groups of values for recursively partitioning a determined set of values measured and/or computed from the process. More detailed embodiments of this stage are described below.

In 506, an on-line stage may be performed, where the one or more computers performing the on-line stage method elements are coupled to the process being analyzed or controlled. As FIG. 5 indicates, the on-line stage may include the following method elements 512-518.

In 512, current process data may be received from the process. Receiving the current process data from the process may include performing measurements on the process, and may include a set of values. In some embodiments, the current process data may also include computed values, e.g., values interpolated or otherwise computed based on the measured values.

In 514, the first plurality of linear equations may be recursively solved for a first group of the set of values, where the first group of the set of values partitions the set of values into respective subsets of values, and where the recursively solving produces solved values for respective first groups of the set/subset of values. In other words, the first plurality of linear equations is solved for the first group of the set of values, and is used to partition the remainder of the set of values into subsets. Then, the first plurality of linear equations is solved for respective groups (further subsets) of each of these subsets, generating respective solved values, where each subset is then partitioned using the respective solved values, thereby generating further subsets, and so forth, in a recursive manner, until some stopping condition is met.

In 516, the first plurality of linear equations is then solved for remaining unsolved values in the set of values, where the recursively solving and the solving produce solved values for the set of values. Said another way, once the stopping condition is met, all those subsets of the set of values for which the equations have not been solved are processes, i.e., the equations are solved for these values.

Finally, in 518, the solved values for the set of values are stored, where the solved values are useable to control or analyze the process. For example, the on-line stage may be performed in an iterative manner to control the process.

Figure 6B:
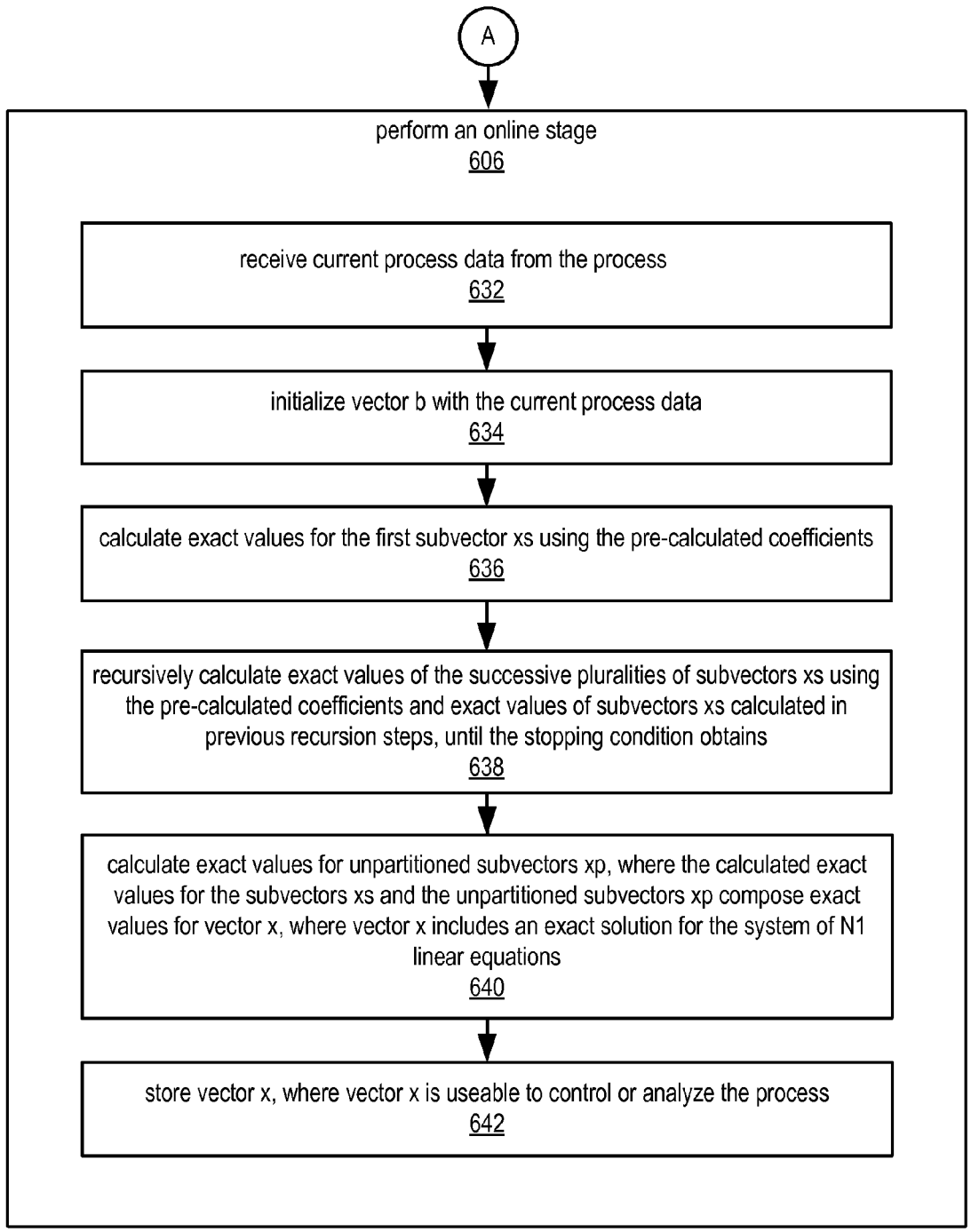

FIGS. 6A and 6B—Flowchart of Another Embodiment of the Method for Controlling or Analyzing a Process by Solving A System of Linear Equations in Real-Time FIGS. 6A and 6B illustrate a more detailed embodiment of a computer-implemented method for controlling or analyzing a process by solving a system of linear equations in real-time. The method shown in FIGS. 6A and 6B may be used in conjunction with any of the computer systems or devices shown in the above figures, among other devices. In various embodiments, some of the method elements shown may be performed concurrently, in a different order than shown, or may be omitted. Additional method elements may also be performed as desired. Note that the various names and symbols used herein are meant to be exemplary only, and are not intended to limit the denoted elements to any particularly form, function, or appearance, but rather are simply used for convenience. As shown, this method may operate as follows.

First, in 602, a sparse and weakly coupled coefficient matrix M may be stored. The matrix M specifies a system of N1 linear equations with N2 unknowns (where in some embodiments, N1 may equal N2), e.g., $M*x=b$, where b is or includes a vector of known values, and where x is or includes a vector of unknown values, and where the system of N1 linear equations models the process. As noted above with respect to the method of FIG. 5, in preferred embodiments, the coefficient matrix M may be large, rectangular, sparse, and weakly coupled, where the system of linear equations is to be solved many times for different values of b. Note that as used herein, the term "vector" refers to a set of values, e.g., ordered values, and is not meant to limit the elements so denoted to any particular form, format, or function.

In 604, an off-line stage may be performed. As indicated in FIG. 6A, performing the off-line stage may include method elements 612-616, described below.

In 612, the matrix M may be analyzed to determine an underlying structure of the matrix corresponding to a geometry (e.g., a topology) of the process, including permuting two or more rows and/or columns of the matrix M. In other words, various of the rows and/or columns of the matrix may be moved or exchanged to change their order in the matrix, whereby the underlying structure of the matrix may be determined.

In 614, a partitioning strategy, e.g., a recursion strategy, may be determined based on the underlying structure of the matrix M. Said another way, based on the underlying structure of the matrix M, a scheme or strategy for partitioning or sub-dividing the problem space for recursive solution may be determined. As FIG. 6A indicates, in some embodiments, determining the partitioning strategy may include performing method elements 622-626, described below.

In 622, a first subvector xs of vector x may be determined that, when solved (i.e., when exact solutions are calculated for points in vector xs), partitions a remainder of vector x into a first plurality of subvectors xp. In other words, a subset of the vector x may be determined that, when exact solutions are calculated, partitions or divides the remainder of the vector into multiple (other) subvectors, referred to as subvectors xp. Note that the values of vector x, which is the solution vector, are not yet determined.

In 624, respective second subvectors xs may be determined for each of the first plurality of subvectors xp, where each second subvector xs partitions a respective subvector xp of the first plurality of subvectors xp into respective second pluralities of subvectors xp.

In 626, successive pluralities of subvectors xs and respective subvectors xp may be recursively determined until a stopping condition obtains. In other words, the determining and partitioning of 622, which was performed with respect to vector x, may be performed with respect to the subvectors xp (624), thereby generating further subvectors xp (e.g., sub-subvectors), and then the determining and partitioning is performed with respect to these further subvectors xp, and so on, until the stopping condition is met.

Note that any stopping condition may be used as desired. However, in preferred embodiments, the stopping condition includes one of: the length of a subvector xp being equal to 1, or the runtime cost of solving the set of N1 linear equations exactly for the subvectors xp being approximately equal to recursion overhead for continuing said recursively determining the successive pluralities of subvectors xs and respective subvectors xp. Determining the runtime cost of solving the set of N1 linear equations exactly for the subvectors xp may be performed using various techniques as desired, e.g., by modeling the runtime behavior of the solution, by estimating the cost based on empirical data from past solutions, etc., among others.

In 616, pre-calculated coefficients may be determined for evaluating exact values of subvectors xs. As will be explained in more detail below, the pre-calculated coefficients may specify or form additional matrices m' that may specify additional linear equations that may be used for solving the subvectors xp. Note that in preferred embodiments, the length of each subvector xs is small compared to the combined lengths of the respective plurality of subvectors xp. For example, a typical size of a subvector xs may be on the order of the square root of the combined lengths of the respective plurality of vectors xp (e.g., or less).

Turning now to FIG. 6B, the method of FIG. 6A is continued.

In 606, an on-line stage may be performed, where, as with the method of FIG. 5, the one or more computers performing the on-line stage method elements are coupled to the process being analyzed or controlled. As FIG. 6 indicates, the on-line stage may include the following method elements 632-642.

In 632, current process data from the process may be received, e.g., measured and/or computed, e.g., interpolated or extrapolated data.

In 634, vector b may be initialized with the current process data, where, as mentioned above, b denotes a vector of known values. In other words, the known values are or include the received process data.

In 636, exact values for the first subvector xs may be calculated using the pre-calculated coefficients.

In 638, exact values of the successive pluralities of subvectors xs may be recursively calculated, using the pre-calculated coefficients and the exact values of subvectors xs calculated in previous recursion steps, until the stopping condition obtains.

As noted above, in preferred embodiments, the stopping condition includes one of: the length of a subvector xp being equal to 1, or the runtime cost of solving the set of N1 linear equations exactly for the subvectors xp being approximately equal to recursion overhead for continuing said recursively determining the successive pluralities of subvectors xs and respective subvectors xp.

In some embodiments, the method may also include determining the number of recursion steps performed in the recursive determination of 626 above. In other words, the method may track the number of recursive steps performed during the recursive process (and store this value). Thus, in the on-line stage, recursively calculating exact values of the successive pluralities of subvectors xs using the pre-calculated coefficients and exact values of subvectors xs calculated in previous recursion steps, until the stopping condition obtains may include recursively calculating exact values of the successive pluralities of subvectors xs using the pre-calculated coefficients and exact values of subvectors xs calculated in previous recursion steps, until the determined number of recursion steps has been performed. Note that this approach save further time in the on-line stage, since no estimates of runtime costs and recursion overhead need to be computed.

In 640, exact values for unpartitioned subvectors xp may be calculated. In other words, once the recursion has stopped (the stopping condition has been met), those subvectors xp that have not been computed may be calculated or solved. Note that the calculated exact values for the subvectors xs and the unpartitioned subvectors xp compose exact values for vector x, where vector x includes an exact solution for the system of N1 linear equations.

Finally, in 642, vector x may be stored, where vector x is useable to control or analyze the process. In other words, all the solution results may be stored, and may be used to control and/or analyze the process. For example, as noted above, the on-line stage may be performed in an iterative manner to control the process.

Further Embodiments

The following provided further information and details of various embodiments of the above-described methods. More specifically, the below describes embodiments wherein the disclosed techniques are applied to a process modeled by a partial differential equation, such as the tokamak plasma confinement problem mentioned above. However, it should be noted that be below examples are meant to be exemplary and illustrative, and are not intended to limit the application of the techniques disclosed herein to any particular form or convention.

For example, some prior art approaches to this problem rely on a PCA (principle component analysis)-based approximation for a Grad-Shafranov solver. However, as indicated above, these approaches are inadequate for many high-performance, e.g., real-time, applications. Thus, embodiments of the methods disclosed herein may provide for a more accurate (and faster) solver.

More specifically, referring back to equation (2), the non-linearities of the right side of equation (2) may be approximated by low-order polynomials in R and in the unknown function $\psi$, e.g.,:

$$j_\theta(R, \psi) = \sum_{n=0}^{N} \alpha_n \left( \frac{\psi_{norm} +}{\frac{\partial \psi_{norm}}{\partial Z} \delta_Z} \right)^n + \frac{\mu_0}{4\pi^2 R^2} \sum_{n=0}^{N} \beta_n \left( \frac{\psi_{norm} +}{\frac{\partial \psi_{norm}}{\partial Z} \delta_Z} \right)^n \quad (3)$$

with parameters $\alpha, \beta, \delta_Z$, and where $\psi_{norm}$ is the normalized flux, given by:

$$\psi_{norm} = \frac{\psi - \psi_{axis}}{\psi_{bdy} - \psi_{axis}} \quad (4)$$

A general elliptic linear PDE is shown in (5):

$$a(x, y)\frac{\partial^2 u}{\partial x^2} + b(x, y)\frac{\partial u}{\partial x} + c(x, y)\frac{\partial^2 u}{\partial y^2} + \quad (5)$$
$$\ldots + d(x, y)\frac{\partial u}{\partial y} + e(x, y)\frac{\partial^2 u}{\partial x \partial y} + f(x, y)u = g(x, y)$$

Now, if a finite-difference method is applied over an N×N grid, equation (6) is obtained for each point on the grid:

$$A(x, y)u_{x+1,y} + B(x, y)u_{x,y} + C(x, y)u_{x-1,y} + D(x, y)u_{x,y+1} + \quad (6)$$
$$\ldots E(x, y)u_{x,y-1} + F(x, y)u_{x+1,y+1} + G(x, y) = 0$$

$$A(x, y) = \frac{a(x, y)}{\Delta_x^2} + \frac{b(x, y)}{\Delta_x} - \frac{e(x, y)}{\Delta_x \Delta_y}$$

$$B(x, y) = -2\frac{a(x, y)}{\Delta_x^2} - 2\frac{c(x, y)}{\Delta_y^2} -$$
$$\frac{b(x, y)}{\Delta_x} - \frac{d(x, y)}{\Delta_y} + \frac{e(x, y)}{\Delta_x \Delta_y} + f(x, y)$$

$$C(x, y) = \frac{a(x, y)}{\Delta_x^2}$$

$$D(x, y) = \frac{c(x, y)}{\Delta_y^2} + \frac{d(x, y)}{\Delta_y} - \frac{e(x, y)}{\Delta_x \Delta_y}$$

$$E(x, y) = \frac{c(x, y)}{\Delta_y^2}$$

$$F(x, y) = \frac{e(x, y)}{\Delta_x \Delta_y}$$

$$G(x, y) = -g(x, y)$$

$$u_{x\pm 1, y} \equiv u(x \pm \Delta_x, y)$$

$$u_{x, y\pm 1} \equiv u(x, \pm \Delta_y)$$

where $u_{x,y}$ for $1 \leq x,y \leq N$ represent solution of the PDE and $u_{x,y}$ for $x,y=0, N+1$. Given a set of boundary conditions one can calculate $u_{x,y}$ on grid points by solving N×N equations with N×N unknowns, as shown in equation (7):

$$M_{N \times N} u_N = BC_N$$

$$u_N = M_{N \times N}^{-1} BC_N \quad (7)$$

The calculation of inverse matrix $M^{-1}$ presents a challenge that is addressed in detail later.

Note that for simplicity, square grids (e.g., solution grids) are used in these examples. However, the techniques disclosed herein apply to non-rectangular grids as well. In addition, Dirichlet boundary conditions are used in the specification of the problem. While the structure of the matrix and boundary condition vector in (7) changes for Neumann boundary conditions, Dirichlet/Neumann hybrid cases, or cases where the conditions are given both at the edge and at the internal points, the same approach applies. For Neumann conditions, a finite-difference equation applied to first order derivatives can be used to replace $u_{x,y}$ on a boundary. This leaves the number of unknowns the same and modifies the values of matrix M for points that are in the immediate neighborhood of the boundary. This is true for boundary conditions given inside the grid as well. If $u_{x,y}$ is known at a particular grid point, it becomes a boundary condition and moves into the BC vector on the right hand side (RHS) of the equation. If the derivative of u at (x,y) is known instead, $u_{x,y}$ may be removed from the list of unknowns and values of the neighboring points solved by moving Neumann boundary condition to the RHS. Equation (6) may then be used to calculate value of $u_{x,y}$ from its neighbors.

Given the inverse matrix, the real-time stage may include of multiplying the inverse matrix with the boundary condition vector BC. A brute force approach for an N×N grid takes N4 MAC (multiply and accumulate) operations to obtain the solution. For a 128×128 grid that equals 268M operations. Regardless of the CPU computational bandwidth, the calculation is limited by the memory-to-CPU bandwidth because the data set cannot fit in on-CPU cache. Assuming 10 GB/s memory-to-CPU throughput, each iteration takes more than 27 ms to calculate, well beyond the desired goal of 1 ms.

The first reduction in the number FLOPs (FLOating point OPerations per second) required utilizes the system's dependency on roughly 4N boundary conditions. By manipulating columns of the M−1 in (7), the matrix model is reduced and the cost of the evaluation of all points on the N×N grid drops to 4N3, or 8.4M MAC steps for 128×128 grid. This corresponds to 17 GFLOPs for the calculation to meet 1 ms time limit. This is achievable if the system has at least 36 MB of cache (each point is 4 bytes). If not, the speed is again gated by the memory-to-CPU bandwidth producing calculations that take approximately 4 ms, assuming a 10 GB/s bandwidth.

Figure 7:
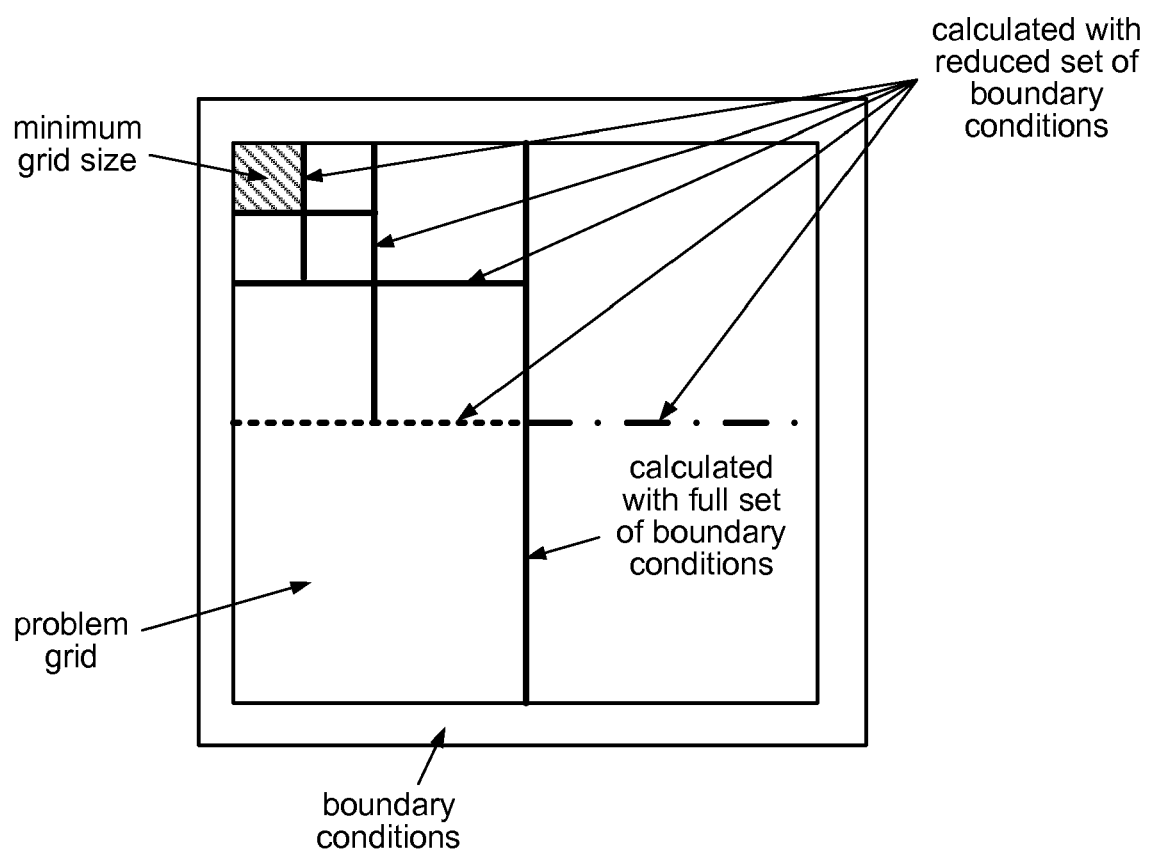
FIG. 7 illustrates partitioning a grid into smaller independent sections, according to one embodiment of the present invention.

There is another avenue available for reducing the number of required calculations. A finite difference method expressed in equation (6) implies that a change in a value of a grid point propagates to each point in the grid and then returns to the original point affecting its value and so on. Consequently, a change in boundary conditions will propagate through the grid like waves until the grid finally settles to the solution. One can say that the grid behaves as a "well connected" system, meaning that only one path between two grid points is needed for changes in their values to affect each other. FIG. 7 illustrates how a grid can be divided or partitioned into two smaller independent sections (divided by center vertical line), where "independent" here means that changes in the values of points in one sub-grid do not affect values of points in the other sub-grid, by calculating a solution on a subsection of the grid. Since the values of the calculated grid points do not change (they represent the partial solution), they must represent boundary conditions for the smaller two sub-grids (the left and right portions of the grid). Smaller grids result in fewer calculations. The process is repeated until a threshold size grid is reached for which the overhead of further subdivision exceeds the cost of calculating values on all of the sub-grid points. Since the grid is rectangular, equation (8) may be used recursively to determine sub-grid sizes for a given problem:

$$S(n+1) = 2 \cdot S(n) + 1 \quad (8)$$

where $S(n+1)$ is the next larger grid and $S(0)$ is the smallest sub-grid size.

A recursive calculation shows that the total number of MAC steps required for calculating solutions on a 127×127 grid size partitioned to the minimum sub-grid size of 7×7 as shown in FIG. 3, is 792573, or 1.6 GFLOPs for execution computing in 1 ms. In general, the calculation cost scales for a 2D grid with length N in each dimension as O(N2 log N). Note that the same principle applies to grids of any shape as long as a reasonable subset of points exists that subdivide the grid into a subset of smaller independent grids and use the values at these subsets of points as boundary conditions for the smaller grids. This is also applicable for solving similar problems in higher dimensions. As an example, FIG. 7 models a 3D case if the lines represent planes of a 3D grid.

As hinted above, there are two key parameters that impact performance for a given calculation time. If data fits in on-CPU cache, the CPU FLOPs govern the problem size. On the other hand, if data does not fit into the cache, then the memory bandwidth is a bottleneck. For example, solving equation (5) using the described approach requires the same number of MAC steps regardless of the form of function a(x,y), b(x,y), c(x,y), etc. However, if these functions are constants (e.g., Laplace PDE=>a(x,y)=1, c(x,y)=1, others are 0), most of the pre-calculated data is shared between sub-grids of equal size making CPU FLOPs a determining factor. If the functions depend on only one coordinate then off-line data is slightly larger making cache size a bottleneck at smaller problem sizes. The most general case, when at least one function depends on both coordinates, results in the most off-line data and hits the cache boundaries for even smaller sizes.

The same reasoning applies to the non-linear version of equation (5), as illustrated by equation (9).

$$a(x,y)\frac{\partial^2 u}{\partial x^2} + b(x,y)\frac{\partial u}{\partial x} + c(x,y)\frac{\partial^2 u}{\partial y^2} + d(x,y)\frac{\partial u}{\partial y} + \ldots + \quad (9)$$
$$e(x,y)\frac{\partial^2 u}{\partial x \partial y} + f(x,y)u - g(x,y) = \Phi(x,y,u)$$

where $\Phi(x,y,u)$ is an arbitrary function. The solution is obtained iteratively in which the solution from step n is inserted in the RHS of (9) and used to calculate the solution for step n+1. If the problem is well behaved, the result converges rapidly. The number of iterations is either fixed to achieve determinism or determined by a threshold value where the process stops once the change from one iteration to the next drops below the threshold. Since $\Phi$ is not part of the pre-calculated data set, its form can be adjusted on the fly on a per-iteration basis.

The major difference between the linear and non-linear case is that in the non-linear case computing the grid points depend on both the boundary conditions and the current value of the function on all grid points. This makes it more expensive in terms of calculation for the same size grid. An N×N grid with M iteration requires:

$$M\left[N^3 + 2N\frac{N}{2}\frac{N}{2} + 4\left(\frac{N^3}{2} + 2\frac{N}{2}\frac{N}{4}\frac{N}{4}\right) + \ldots + Calc(\Phi)\right] = \quad (10)$$
$$M\left[\frac{3}{2}N^3 + \frac{3}{4}N^3 + \ldots + Calc(\Phi)\right] = M[3N^3 + Calc(\Phi)]$$

which is roughly 24.5 M MACs or 50 GFlops for execution in 1 ms on a 127×127 grid taking four iterations. The $\Phi$ calculation cost scales as O(N2) vs O(N3) for the leading term in (10) so it can be ignored in most cases.

Inverse Matrix

Turning now to the inverse matrix calculation issue. For 2D problems, the size of the inverse matrix of equation (7) grows as O(N4), and the cost of its calculation grows as O(N8), where N is the length of a grid in one dimension. Since inverting a matrix is part of an off-line stage, the memory requirement is of greater importance. A complete inverse matrix for a 1024×1024 grid would be a dense matrix with 1M×1M elements requiring 4 TB of memory, something that may not be foreign to HPC systems but it is not accessible in standard off-the-shelf systems. However, due to the partitioning approach disclosed herein, the entire matrix is not needed. Rather, only the inverse matrix rows corresponding to points used to reduce the grid to smaller sizes are required, e.g., corresponding to points lying on the center vertical line of FIG. 7. As technique has been developed for calculating the rows that works for both the linear and the non-linear case and does not require a great deal of memory.

For the linear case, equation (7) implies that flattened grid values solved for a unit boundary condition vector BC (for Boundary Condition), a vector for which only one element is 1 and all others are 0, will be equal to the corresponding column of the inverse matrix. One starts with a unit vector BC with 1 in the first row, the system of equations is solved, data are extracted from the rows in the flattened solution corresponding to points of interest, and the rest of the solution is discarded. The calculation is then repeated for the next unit BC vector.

Each calculation requires only O(N2 log N) or O(N3) of memory for linear and non-linear cases, respectively. Since the inverse matrix for the given problem size is not available (or feasible), the solution for unit BC vectors cannot be calculated directly. Instead, the method uses the property that a solution for a larger grid can be found by iterating over solutions on the smaller sub-grids. For example, a solution on a 128×128 grid can be found by iterating over a 4×4 grid of 32×32 sub-grids for which the inverse matrix can be calculated directly. The same approach may be used to actually solve a PDE on a larger grid for which off-line data exceeds on-CPU cache size, when calculations have to be distributed over a cluster of computers, or on GPUs.

A hierarchical approach is another way to obtain solution for girds for which $M^{-1}$ is not known. First, solutions for an N×N grid whose inverse matrix can be obtained directly may be found. Than four N×N grids may be used to obtain the solution for a 2N×2N grid, and so on.

A similar approach can be used for the non-linear case except that now iterations are performed over N×N cases in which boundary conditions are set to 0, and one of the grid points is kept constant at value 1. The calculations may be performed until the grid settles. The flattened result of the last iteration corresponds to a column of the inverse matrix. The time required for the off-line calculation and or the real-time calculation when larger grids are calculated by iterating over a set of smaller grids can be reduced by collapsing the original boundary conditions, for example a 1024×1024 grid into a smaller grid, e.g., a 32×32 grid, performing exact calculations, expanding the result back, and using it as a starting point for subsequent iterations.

Thus, only the portions of the inverse matrix that are needed may be determined.

The above methods are based on splitting a sophisticated solver for linear systems into off-line/on-line parts, where computational resources are expended offline to design a strategy that pays off at runtime. More specifically, as described above, the idea is to calculate (solve exactly) a small subset of points (actually lines) of the solution which can then be used to generate sub-problems (as these lines act as new boundary values). In some embodiments, this approach may be applied to the most common (and very important) case of balanced systems, where the number of inputs and outputs are the same. This covers (among many other things) quite generic elliptic PDEs; however, the basic approach is broadly applicable to other problem types, as well. For example, the above described technique benefits from partitioning the problem so as to compute the solution vector using partial matrix inversion, but it should be noted that in other embodiments, the solution vector may be determined in other ways.

For example, in some alternative embodiments where non-square matrices are used, the solution vector may be computed using partial matrix pseudo-inversion. This approach may be used, for example, when the number of linear equations is not equal to the number of unknowns, e.g., when N1<>N2, i.e. when the system is over/underdetermined. A typical example of this situation is when one has conflicting information or measurements but a best or most effective solution is still desired. For example, in an exemplary large telescope control application where the system has 6,000 sensors but only 3,000 actuators, and a solution in the actuators is required, there is too much information to satisfy all actuators (i.e., to generate exactly one solution). In this case, pseudo-inverse matrices may be used instead of the inverse matrices discussed above.

In another embodiment, at least a portion of the solution vector may be measured, either directly or indirectly, i.e., at least some of the values of the solution vector, e.g., vector x, may be measured using sensors configured to measure these values directly, and/or may be determined via measurements of other related attributes of the system. In other words, in many applications, additional measurements are available or can be initiated or acquired. Such measurements are typically sparse and must generally be planned in advance. Instead of calculating special points/lines of the solution, one may measure these points/lines. Typically, such measurements are not directly used to solve PDEs, but rather are used for fitting/checking solutions. However, embodiments of the methods disclosed herein may take full advantage of such measurements by using them as sources or boundary conditions for sub-solutions, as indicated above.

Note that if the values of the solution vector are not themselves measurable, but have a known relationship with some other set of attributes that are measurable, then these attributes may be measured and the solution values determined therefrom. As another example, it may be that only a portion of the solution vector values are measurable, but at a high enough resolution that the remaining values may be determined via interpolation and/or extrapolation with an acceptable tolerance, e.g., using a model of the phenomenon, e.g., a model of a field, or a construction/analysis process.

For example, in the context of the methods described above, operations in the offline stage may determine what to measure directly (e.g., which portions of the solution vector x). Indirect measurements may then be made in a manner similar to tomographic reconstruction over the solution vector x, and so may require an additional reconstruction step. However, this can still be computationally cheap given the enormous dimension of the problems under consideration. One example of this approach is the use of soft X-ray tomography for tokamak containment field computations where specific measurements (points) may be used to reconstruct the Grad-Shafranov solution. Another example of a suitable application of this technique includes (computer chip) wafer tests that are based on temperature measurements with very few internal points, but where one really needs the maximum/minimum values of the entire temperature field.

Yet another approach to determining the solution vector is to estimate a portion of the solution vector (e.g., a portion of vector x) using model reduction techniques (based on the well developed theory of system reduction), as known in the control arts. Such techniques generate approximations for specific points, i.e., they don't solve exactly for those points, but rather generate good estimates. However, such estimates can be used to implement the above-described methods.

For example, such techniques may be used to estimate the temperature for one point in the aforementioned wafer application. Note, however, that one cannot use this estimation technique to reconstruct the entire solution. For example, one may estimate a small part of the entire solution vector without requiring excessive computational resources, but it should be noted that in general one cannot estimate all of the solution values as this may be more expensive than solving the vector itself. Thus, the estimate for some portion of the solution vector may be used in conjunction with one of the above approaches, e.g., with the partial matrix inversion technique. Thus, in some embodiments, the solution may be partially estimated and then solved (e.g., estimating 2%, then filling in the remaining 98%).

It should be noted that there are numerous approaches available for solving problems in a computational setting, generally falling in two primary categories: direct methods and iterative methods. Examples of direct approaches or methods include: Gauss elimination, reordering techniques, Jacobi preconditioner, Gauss-Seidel preconditioner, LU (lower-upper) decomposition, Cholesky decomposition, and singular value decomposition (SVD), e.g., where some SVDs are used for generic matrices, and others are used for positive definite matrices, among others. Examples of iterative approaches or methods include: Jacobi or Gauss-Seidel iteration, conjugate gradient, bi-conjugate gradient, multigrid method, and Krylov subspace based methods, e.g., primarily for sparse matrices, e.g., in a geometric or algebraic sense, among others.

Note that embodiments of the present invention belong to the class of iterative approaches or methods. It should be further noted, however, that despite certain similarities (e.g., use of grids) the solution techniques disclosed herein are not multigrid methods. For example, as is well known, multigrid methods perform several iterations with respect to the original grid, e.g., using a Gauss-Seidel preconditioner, decrease the grid size by a factor of 2, iterate again, decrease the grid size by a factor of 2 again, iterate, and so forth, and up-sampling (from coarse grid to finer grid) using interpolation. Note that this approach requires knowing b in the expression $M*x=b$ (see eq. (1) above). In contrast, in embodiments of the present invention, the slope M is analyzed in advance and defines new problems of smaller size, which is particularly beneficial for real time (RT) applications.

Thus, various embodiments of the above systems and methods may provide for high-performance control and/or analysis of systems and processes.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions for controlling or analyzing a process by solving a set of linear equations in real-time, wherein the program instructions are executable by a processor to:
   store a first plurality of linear equations that models the process, wherein the process comprises one or more of:
   a manufacturing process;
   an automation process; or
   a simulation process;
   perform an off-line stage, wherein to perform the off-line stage the program instructions are executable to:
   determine a partitioning strategy based on the first plurality of linear equations, wherein said determining the partitioning strategy comprises determining groups of values for recursively partitioning a determined set of values measured or computed from the process; and perform an on-line stage, wherein to perform the on-line stage, the program instructions are executable to:
receive current process data from the process, wherein at least a portion of the current process data from the process comprises measurements on the process, wherein the current process data comprises a set of values;
recursively solve the first plurality of linear equations for a first group of the set of values, wherein the first group of the set of values partitions the set of values into respective subsets of values, wherein said recursively solving produces solved values for respective first groups of the set/subset of values;
solve the first plurality of linear equations for remaining unsolved values in the set of values;
wherein said recursively solving and said solving produce solved values for the set of values; and
store the solved values for the set of values, wherein the solved values are useable to control or analyze the process.

2. The memory medium of claim 1, wherein the program instructions are executable to:
repeat the online stage multiple times in an iterative manner to control or analyze the process.

3. The memory medium of claim 1,
wherein to store a first plurality of linear equations that models the process, the program instructions are executable to:
store a solution grid for a set of linear equations comprising N1 equations with N2 unknowns, wherein the solution grid comprises a set of points;
wherein to recursively solve the first plurality of linear equations for a first group of the set of values, the program instructions are executable to:
solve the set of linear equations exactly for a specified subset of points in the grid, wherein the subset of points divides the grid into a first plurality of independent sub-grids for which the subset of points comprises at least a portion of each of their boundary conditions; and
recursively perform said solving for each sub-grid of the first plurality of independent sub-grids until a specified stopping condition obtains, thereby generating a second plurality of sub-grids; and
wherein to solve the first plurality of linear equations for remaining unsolved values in the set of values, the program instructions are executable to:
solve the set of linear equations exactly for the points in each of the second plurality of sub-grids.

4. The memory medium of claim 3, wherein the stopping condition comprises the calculation cost of solving the set of linear equations exactly for the points in each of the second plurality of sub-grids being approximately equal to recursion overhead for continuing said recursively performing.

5. The memory medium of claim 1,
wherein to store a first plurality of linear equations that models the process, the program instructions are executable to:
store a sparse and weakly coupled coefficient matrix M that specifies a system of N1 linear equations with N2 unknowns, $M*x=b$, wherein b comprises a vector of known values, and wherein x comprises a vector of unknown values, and wherein the system of N1 linear equations models the process;

wherein to determine a partitioning strategy based on the first plurality of linear equations, the program instructions are executable to:
analyze the matrix M to determine an underlying structure of the matrix corresponding to a geometry of the process, including permuting two or more rows or columns of the matrix M; and
determine the partitioning strategy based on the underlying structure of the matrix M, wherein, to determine the partitioning strategy, the program instructions are executable to:
determine a first subvector xs of vector x that when solved partitions a remainder of vector x into a first plurality of subvectors xp;
determine respective second subvectors xs for each of the first plurality of subvectors xp, wherein each second subvector xs, when solved, partitions a respective subvector xp of the first plurality of subvectors xp into respective second pluralities of subvectors xp; and
recursively determine successive pluralities of subvectors xs and respective subvectors xp until a stopping condition obtains, wherein the length of each subvector xs is small compared to the combined lengths of the respective plurality of subvectors xp.

6. The memory medium of claim 5, wherein to perform the offline stage, the program instructions are further executable to:
pre-calculate coefficients for evaluating exact values of subvectors xs.

7. The memory medium of claim 6,
wherein to perform the on-line stage, the program instructions are further executable to:
initialize vector b with the current process data;
wherein to recursively solve the first plurality of linear equations for a first group of the set of values, the program instructions are executable to:
calculate exact values for the first subvector xs using the pre-calculated coefficients; and
recursively calculate exact values of the successive pluralities of subvectors xs using the pre-calculated coefficients and exact values of subvectors xs calculated in previous recursion steps, until the stopping condition obtains;
wherein to solve the first plurality of linear equations for remaining unsolved values in the set of values, the program instructions are executable to:
calculate exact values for unpartitioned subvectors xp;
wherein the calculated exact values for the subvectors xs and the unpartitioned subvectors xp compose exact values for vector x, wherein vector x comprises an exact solution for the system of N1 linear equations; and
wherein to store the solved values for the set of values, the program instructions are executable to:
store vector x, wherein vector x is useable to control or analyze the process.

8. The memory medium of claim 7,
wherein the stopping condition comprises one of:
the length of a subvector xp being equal to 1; or
the runtime cost of solving the set of N1 linear equations exactly for the subvectors xp being approximately equal to recursion overhead for continuing said recursively determining the successive pluralities of subvectors xs and respective subvectors xp;
wherein the program instructions are further executable to:
determine a number of recursion steps performed in said recursively determining;

wherein to recursively calculate exact values of the successive pluralities of subvectors xs using the pre-calculated coefficients and exact values of subvectors xs calculated in previous recursion steps, until the stopping condition obtains, the program instructions are executable to:
recursively calculate exact values of the successive pluralities of subvectors xs using the pre-calculated coefficients and exact values of subvectors xs calculated in previous recursion steps, until the determined number of recursion steps has been performed.

9. The memory medium of claim 1, wherein to perform measurements on the process, the program instructions are executable to:
perform direct measurements of the current process data; or
perform direct measurements of first process data, then determine the current process data based on the first process data.

10. The memory medium of claim 1, wherein the first plurality of linear equations has an associated coefficient matrix, and wherein to recursively solve or solve, the program instructions are executable to:
compute one or more partial matrix inversions.

11. The memory medium of claim 1, wherein the first plurality of linear equations has an associated coefficient matrix, wherein to recursively solve or solve, the program instructions are executable to:
compute one or more partial matrix pseudo-inversions.

12. The memory medium of claim 1, wherein to recursively solve or solve, the program instructions are executable to:
estimate at least a portion of the solved values using model reduction techniques.

13. A computer-implemented method for controlling or analyzing a process by solving a set of linear equations in real-time, comprising:
utilizing a computer to perform:
storing, in a memory of the computer, a first plurality of linear equations that models the process, wherein the process comprises one or more of:
a manufacturing process;
an automation process; or
a simulation process;
performing, via the computer, an off-line stage, comprising:
determining a partitioning strategy based on the first plurality of linear equations, wherein said determining the partitioning strategy comprises determining groups of values for recursively partitioning a determined set of values measured or computed from the process; and
performing, via the computer, an on-line stage wherein the computer is coupled to the process, comprising:
receiving current process data from the process, wherein said receiving current process data from the process comprises performing measurements on the process, wherein the current process data comprises a set of values;
recursively solving the first plurality of linear equations for a first group of the set of values, wherein the first group of the set of values partitions the set of values into respective subsets of values, wherein said recursively solving produces solved values for respective first groups of the set/subset of values;
solving the first plurality of linear equations for remaining unsolved values in the set of values;
wherein said recursively solving and said solving produce solved values for the set of values; and
storing, in the memory of the computer, the solved values for the set of values, wherein the solved values are useable to control or analyze the process.

14. The method of claim 13, further comprising:
repeating the online stage multiple times in an iterative manner to control or analyze the process.

15. The method of claim 13,
wherein said storing a first plurality of linear equations that models the process comprises:
storing a solution grid for a set of linear equations comprising N1 equations with N2 unknowns, wherein the solution grid comprises a set of points;
wherein said recursively solving the first plurality of linear equations for a first group of the set of values comprises:
solving the set of linear equations exactly for a specified subset of points in the grid, wherein the subset of points divides the grid into a first plurality of independent sub-grids for which the subset of points comprises at least a portion of each of their boundary conditions; and
recursively performing said solving for each sub-grid of the first plurality of independent sub-grids until a specified stopping condition obtains, thereby generating a second plurality of sub-grids; and
wherein said solving the first plurality of linear equations for remaining unsolved values in the set of values comprises:
solving the set of linear equations exactly for the points in each of the second plurality of sub-grids.

16. The method of claim 15, wherein the stopping condition comprises the calculation cost of solving the set of linear equations exactly for the points in each of the second plurality of sub-grids being approximately equal to recursion overhead for continuing said recursively performing.

17. The method of claim 13,
wherein said storing a first plurality of linear equations that models the process comprises:
storing a sparse and weakly coupled coefficient matrix M that specifies a system of N1 linear equations with N2 unknowns, $M*x=b$, wherein b comprises a vector of known values, and wherein x comprises a vector of unknown values, and wherein the system of N1 linear equations models the process;
wherein said determining a partitioning strategy based on the first plurality of linear equations comprises:
analyzing the matrix M to determine an underlying structure of the matrix corresponding to a geometry of the process, including permuting two or more rows or columns of the matrix M;
determining the partitioning strategy based on the underlying structure of the matrix M, comprising:
determining a first subvector xs of vector x that when solved partitions a remainder of vector x into a first plurality of subvectors xp;
determining respective second subvectors xs for each of the first plurality of subvectors xp, wherein each second subvector xs, when solved, partitions a respective subvector xp of the first plurality of subvectors xp into respective second pluralities of subvectors xp; and
recursively determining successive pluralities of subvectors xs and respective subvectors xp until a stopping condition obtains, wherein the length of each subvector xs is small compared to the combined lengths of the respective plurality of subvectors xp.

18. The method of claim 17, wherein the offline stage further comprises:
pre-calculating coefficients for evaluating exact values of subvectors xs.

19. The method of claim 18,
wherein said performing the on-line stage further comprises:
initializing vector b with the current process data;
wherein said recursively solving the first plurality of linear equations for a first group of the set of values comprises:
calculating exact values for the first subvector xs using the pre-calculated coefficients; and
recursively calculating exact values of the successive pluralities of subvectors xs using the pre-calculated coefficients and exact values of subvectors xs calculated in previous recursion steps, until the stopping condition obtains;
wherein said solving the first plurality of linear equations for remaining unsolved values in the set of values comprises:
calculating exact values for unpartitioned subvectors xp;
wherein the calculated exact values for the subvectors xs and the unpartitioned subvectors xp compose exact values for vector x, wherein vector x comprises an exact solution for the system of N1 linear equations; and
wherein said storing the solved values for the set of values comprises:
storing vector x, wherein vector x is useable to control or analyze the process.

20. The method of claim 19,
wherein the stopping condition comprises one of:
the length of a subvector xp being equal to 1; or
the runtime cost of solving the set of N1 linear equations exactly for the subvectors xp being approximately equal to recursion overhead for continuing said recursively determining the successive pluralities of subvectors xs and respective subvectors xp;
the method further comprising:
determining a number of recursion steps performed in said recursively determining;
wherein said recursively calculating exact values of the successive pluralities of subvectors xs using the pre-calculated coefficients and exact values of subvectors xs calculated in previous recursion steps, until the stopping condition obtains comprises:
recursively calculating exact values of the successive pluralities of subvectors xs using the pre-calculated coefficients and exact values of subvectors xs calculated in previous recursion steps, until the determined number of recursion steps has been performed.

21. The method of claim 13, wherein said performing measurements on the process comprises:
performing direct measurements of the current process data; or
performing direct measurements of first process data, then determining the current process data based on the first process data.

22. A non-transitory computer accessible memory medium that stores program instructions for controlling or analyzing a process by solving a set of linear equations in real-time, wherein the program instructions are executable by a processor to:
store a first plurality of linear equations that models the process, wherein the process comprises a petrochemical exploration or production process;
perform an off-line stage, wherein to perform the off-line stage the program instructions are executable to:
determine a partitioning strategy based on the first plurality of linear equations, wherein said determining the partitioning strategy comprises determining groups of values for recursively partitioning a determined set of values measured or computed from the process; and
perform an on-line stage, wherein to perform the on-line stage, the program instructions are executable to:
receive current process data from the process, wherein at least a portion of the current process data from the process comprises measurements on the process, wherein the current process data comprises a set of values;
recursively solve the first plurality of linear equations for a first group of the set of values, wherein the first group of the set of values partitions the set of values into respective subsets of values, wherein said recursively solving produces solved values for respective first groups of the set/subset of values;
solve the first plurality of linear equations for remaining unsolved values in the set of values;
wherein said recursively solving and said solving produce solved values for the set of values; and
store the solved values for the set of values, wherein the solved values are useable to control or analyze the process.

23. A non-transitory computer accessible memory medium that stores program instructions for controlling or analyzing a process by solving a set of linear equations in real-time, wherein the program instructions are executable by a processor to:
store a first plurality of linear equations that models the process, wherein the process comprises a financial or securities-related process;
perform an off-line stage, wherein to perform the off-line stage the program instructions are executable to:
determine a partitioning strategy based on the first plurality of linear equations, wherein said determining the partitioning strategy comprises determining groups of values for recursively partitioning a determined set of values measured or computed from the process; and
perform an on-line stage, wherein to perform the on-line stage, the program instructions are executable to:
receive current process data from the process, wherein at least a portion of the current process data from the process comprises measurements on the process, wherein the current process data comprises a set of values;
recursively solve the first plurality of linear equations for a first group of the set of values, wherein the first group of the set of values partitions the set of values into respective subsets of values, wherein said recursively solving produces solved values for respective first groups of the set/subset of values;
solve the first plurality of linear equations for remaining unsolved values in the set of values;
wherein said recursively solving and said solving produce solved values for the set of values; and
store the solved values for the set of values, wherein the solved values are useable to control or analyze the process.

* * * * *